(No Model.)
R. B. IRELAND.
SWITCH SIGNAL.
No. 249,944. Patented Nov. 22, 1881.
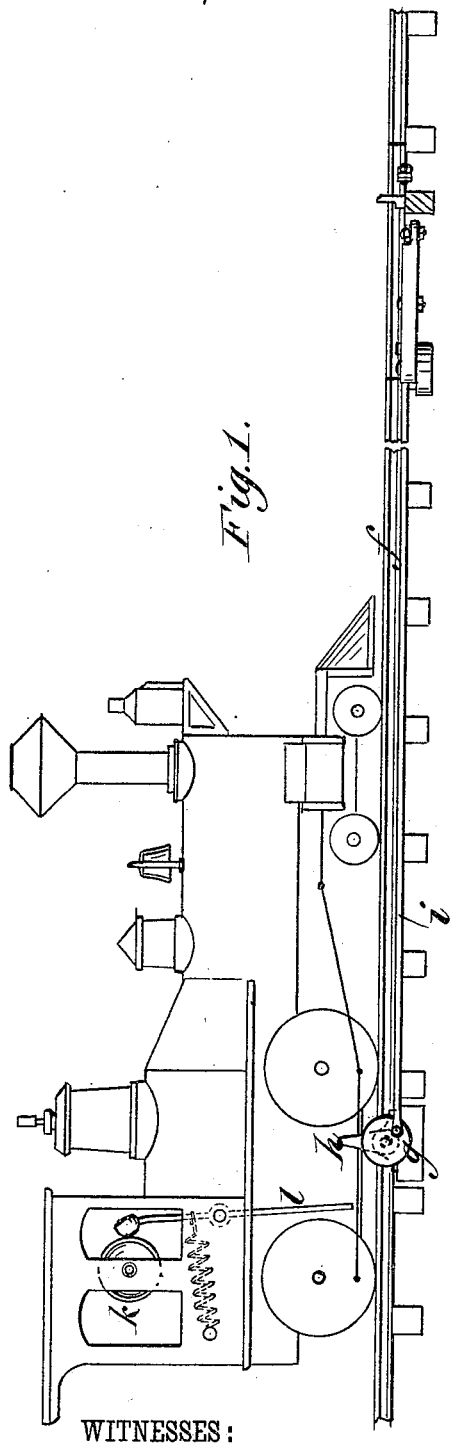
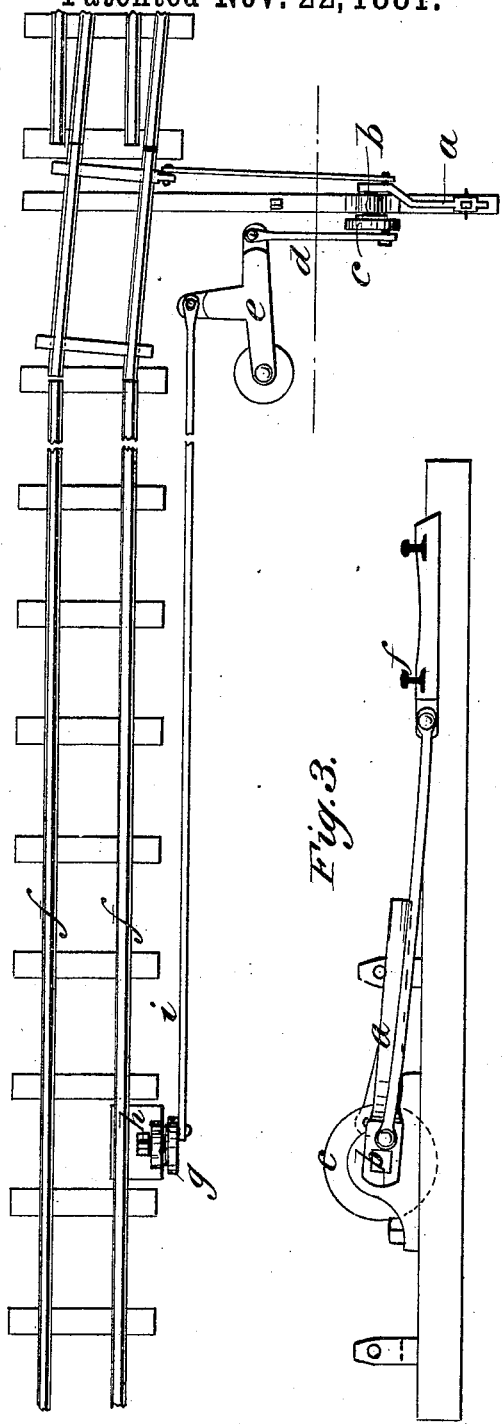
WITNESSES:
Donn Twitchell
C. Sedgwick
INVENTOR:
R. B. Ireland
BY Munn & Co
ATTORNEYS.

UNITED STATES PATENT OFFICE.

RICHARD B. IRELAND, OF TRENTON, NEW JERSEY.

SWITCH-SIGNAL.

SPECIFICATION forming part of Letters Patent No. 249,944, dated November 22, 1881.

Application filed July 18, 1881. (No model.)

*To all whom it may concern:*

Be it known that I, RICHARD B. IRELAND, of Trenton, in the county of Mercer and State of New Jersey, have invented a new and useful Improvement in Switch-Signals, of which the following is a full, clear, and exact specification.

The object of my invention is to give notice of open or misplaced switches and draw-bridges by an alarm on approaching engines, and thereby obtain security against accident, additional to the usual signals.

The invention consists in the combination, with the switch-operating mechanism, of a turning-dog located near the rails and used in connection with a gong-operating lever on the engine.

In the drawings, Figure 1 is a side view of an engine and track fitted with my improved devices. Fig. 2 is a plan view of the track and switch, and Fig. 3 is a cross-section of the switch.

Similar letters of reference indicate corresponding parts.

The switch mechanism shown is of ordinary construction. $a$ is the lever; $b$, the rock-shaft on which the lever is hung; and $c$ is a crank wheel or disk, connected by a rod, $d$, with a bell-crank lever, $e$, by which the alarm devices are moved.

At the side of the track, preferably outside the rails $f$, and at a suitable distance from the switch, is fixed a block or other suitable support for the turning-dog. The dog consists of a crank wheel or disk, $g$, with an arm, $h$, secured upon its shaft, which connects by a rod, $i$, to the lever $e$, before mentioned. The parts are positioned so that when the lever $e$ is swung by movement of the switch-lever to open the switch the dog is turned and arm $h$ elevated.

In the cab of the locomotive is fixed a gong, $k$, and a spring-actuated lever, $l$, hung in the cab, bears by one end, which is formed as a hammer, on the gong, while the other end extends down at the side of the locomotive to a position for contact with the arm $h$ of the dog. The position of lever $l$ is in front of the rear driving-wheel or back of the step, where it is out of the way.

In operation, in case the switch is open, the arm of the dog is elevated, and the lever $l$ of the approaching engine, coming in contact with the dog, is moved back until it clears, when the spring draws the hammer end against the gong with a blow. A signal is thus given to the engineer, so that in case he has failed to see the usual signals warning is given in time.

By this invention a warning is given which is not likely to be overlooked, and the greatest possible security against accident thus obtained.

I am aware that swinging arms on posts at the side of the track have been used to give signals on locomotives; but those are liable to get out of order, and are often a source of danger to brakemen on freight trains and of damage to the cars.

I am aware that elastic fingers have been so connected to a draw of a bridge that when the draw is open the fingers will be turned in position across the track, so that they will rub against the sides of the cars of a passing train to produce an alarm; and I am also aware that an eccentric provided with an arm has been secured to a locomotive and connected through the medium of levers to a gong on the locomotive, so that it is adapted to be struck by a projection arranged in the road-bed to sound an alarm; but

What I claim, and desire to secure by Letters Patent, is—

1. In a switch-signal, the combination, with the bell-operating lever on the locomotive and the switch-operating mechanism, of the disk or wheel $g$, provided with the arm $h$ on its shaft, fitted at the side of the road-bed and connected to the said switch mechanism, whereby when the switch is opened the arm will be elevated and the bell-lever operated, substantially as shown and described.

2. The combination of the crank-disk $c$, operated by the switch-lever, lever $e$, rods $d$ $i$, and turning-dog $g$, located at the side of the track, substantially as shown and described, for operation of a bell-lever on the locomotive to give an alarm when the switch is open.

RICHARD B. IRELAND.

Witnesses:
GEO. D. WALKER,
C. SEDGWICK.